(12) United States Patent
Itaba et al.

(10) Patent No.: US 11,193,442 B2
(45) Date of Patent: Dec. 7, 2021

(54) FUEL INJECTION CONTROL DEVICE

(71) Applicant: Hitachi Automotive Systems, Ltd., Hitachinaka (JP)

(72) Inventors: Fumihiro Itaba, Hitachinaka (JP); Osamu Mukaihara, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/051,883

(22) PCT Filed: Feb. 14, 2019

(86) PCT No.: PCT/JP2019/005211
§ 371 (c)(1),
(2) Date: Oct. 30, 2020

(87) PCT Pub. No.: WO2019/225076
PCT Pub. Date: Nov. 28, 2019

(65) Prior Publication Data
US 2021/0123393 A1 Apr. 29, 2021

(30) Foreign Application Priority Data
May 23, 2018 (JP) .............................. JP2018-098595

(51) Int. Cl.
*F02D 41/22* (2006.01)
*F02D 41/30* (2006.01)
(Continued)

(52) U.S. Cl.
CPC ............. *F02D 41/22* (2013.01); *F02D 41/20* (2013.01); *F02D 41/30* (2013.01); *F02M 51/06* (2013.01)

(58) Field of Classification Search
CPC .......... F02D 41/22; F02D 41/20; F02D 41/30; F02M 51/06
(Continued)

(56) References Cited

U.S. PATENT DOCUMENTS

2002/0093360 A1* 7/2002 Nagata ............... G01R 31/2884
361/86
2004/0118384 A1* 6/2004 Oyama ............... F02D 41/3082
123/479
(Continued)

FOREIGN PATENT DOCUMENTS

| JP | 2014-152697 A | 8/2014 |
| JP | 2015-055277 A | 3/2015 |
| WO | WO-2017/006814 A1 | 1/2017 |

OTHER PUBLICATIONS

International Search Report with English translation and Written Opinion issued in corresponding application No. PCT/JP2019/005211 dated May 7, 2019.

*Primary Examiner* — Mahmoud Gimie
(74) *Attorney, Agent, or Firm* — Foley & Lardner LLP

(57) ABSTRACT

Provided is a fuel injection control device capable of detecting individual differences in fuel injection valves and appropriately collecting information on the individual differences. For this reason, the fuel injection control device includes a fuel injection valve drive circuit that supplies a current or a voltage to a coil of a fuel injection valve to drive the fuel injection valve, a valve body operation time period detection unit that detects a valve body operation time period related to an operation of a valve body of the fuel injection valve, and a state determination unit that determines that at least one of the fuel injection valve, the valve body operation time period detection unit, and the fuel injection valve drive circuit is abnormal based on information related to a valve (Continued)

body operation time period detected by the valve body operation time period detection unit.

10 Claims, 11 Drawing Sheets

(51) Int. Cl.
  *F02M 51/06* (2006.01)
  *F02D 41/20* (2006.01)
(58) Field of Classification Search
  USPC .......................................................... 701/103
  See application file for complete search history.

(56) References Cited

U.S. PATENT DOCUMENTS

| | | | |
|---|---|---|---|
| 2007/0227506 A1* | 10/2007 | Perryman | F02D 41/2096 |
| | | | 123/479 |
| 2010/0024777 A1* | 2/2010 | Hoffmann | F02D 41/221 |
| | | | 123/479 |
| 2015/0377176 A1 | 12/2015 | Hatanaka | |
| 2016/0252037 A1* | 9/2016 | Katsurahara | F02D 41/2467 |
| | | | 123/480 |
| 2018/0195450 A1 | 7/2018 | Mukaihara | |

* cited by examiner

FUEL INJECTION CONTROL DEVICE

TECHNICAL FIELD

The present invention relates to a fuel injection control device that controls fuel injection into an internal combustion engine.

BACKGROUND ART

Due to the recent tightening of automobile fuel consumption and exhaust gas regulations, it has been required to achieve both low fuel consumption and high output of an internal combustion engine at the same time and satisfy the regulations in a wide operating range of the internal combustion engine. As one of the means for achieving this, expansion of the dynamic range of the fuel injection valve is required. In order to expand the dynamic range of the fuel injection valve, it is necessary to improve the dynamic flow characteristics while ensuring the conventional static flow characteristics. As a method of improving this dynamic flow characteristics, reduction in the minimum injection amount by half lift control is known. The half lift control is a control for returning the valve body of the fuel injection valve to the valve closed position without reaching the position (full lift position) where the valve body is completely opened.

In recent years, in particular, in fuel injection control of a direct injection type internal combustion engine, a multi-stage injection system in which injection per cycle is divided into several stages is widely adopted. In the case of the multi-stage injection system, when the number of divisions increases, it is necessary to reduce the injection amount per stage.

Therefore, it is possible to reduce the injection amount per stage by realizing the injection of each stage of the multi-stage injection by the half lift control.

In the half lift control, it is required to perform the position control of the valve body with higher accuracy, compared with that in the full lift control. It is known that the variation of the injection amount in the half lift control is large due to the individual difference of the fuel injection valve. Even when each of the fuel injection valves of a plurality of internal combustion engines is driven by the same drive pulse, the movement of the valve body of each fuel injection valve changes, and the valve opening completion time period and the valve closing completion time period of the fuel injection valve will vary due to individual differences in spring characteristics and solenoid characteristics of each fuel injection valve, so that the injection amount varies among a plurality of internal combustion engines.

For this reason, various techniques have been proposed that determines individual differences that occur for each fuel injection valve. For example, PTL 1 discloses a technique of indirectly detecting an individual difference regarding the timing when the valve body of the fuel injection valve is in the valve open state or the valve close state based on electrical characteristics such as a change in inductance. However, in PTL 1, when abnormality (fault, deterioration, performance deterioration, etc.) occurs in the input circuit of the electric signal for detecting the electrical characteristics, the filter, the fuel injection valve main body, the drive circuit that drives the fuel injection valve, and other components, it is a disturbance for detection of the individual differences. When the completion of valve opening or the completion of valve closing is detected in the presence of disturbance, the deviation between the target injection amount and the actual injection amount increases, so that there is a possibility of causing deterioration of fuel consumption efficiency and exhaust performance, and unintended torque fluctuation of the internal combustion engine.

On the other hand, PTL 2 describes that individual differences are learned by a predetermined method and learning is prohibited when a learning execution condition is not satisfied. However, PTL 2 does not specifically describe the detection of the individual difference, and further does not describe a specific example in which the learning execution condition is not satisfied. Therefore, the problem with PTL 1 cannot be solved even by the technique of PTL 2.

CITATION LIST

Patent Literature

PTL 1: JP 2014-152697 A
PTL 2: WO 2017/006814

SUMMARY OF INVENTION

Technical Problem

An object of the present invention is to provide a fuel injection control device capable of detecting individual differences in fuel injection valves and appropriately collecting information on the individual differences.

Solution to Problem

In order to solve the above problems, a fuel injection control device according to the present invention includes a fuel injection valve drive circuit that supplies a current or a voltage to a coil of a fuel injection valve to drive the fuel injection valve, a valve body operation time period detection unit that detects a valve body operation time period related to an operation of a valve body of the fuel injection valve, and a state determination unit that determines that at least one of the fuel injection valve, the valve body operation time period detection unit, and the fuel injection valve drive circuit is abnormal based on information related to a valve body operation time period detected by the valve body operation time period detection unit.

Advantageous Effects of Invention

According to the fuel injection control device of the present invention, it is possible to provide a fuel injection control device capable of detecting individual differences of fuel injection valves and appropriately collecting information on the individual differences.

DESCRIPTION OF EMBODIMENTS

The present embodiment will be described below with reference to the accompanying drawings. In the accompanying drawings, functionally the same elements may be represented by the same numbers. Although the accompanying drawings show embodiments and implementation examples according to the principles of the present disclosure, these are for understanding of the present disclosure, and it is in no way used to limit the disclosure. The descriptions in this specification are merely exemplary, and are not intended to limit the scope of the claims and application of the present disclosure in any sense.

In the embodiment, although sufficient details are described for one of ordinary skill in the art to implement the present disclosure, other implementations/forms are possible, and it should be understood that the configurations and structures can be changed and various elements can be replaced without departing from the scope and spirit of the technical idea of the present disclosure. Therefore, the following description should not be limited to this.

First Embodiment

Figure 1:
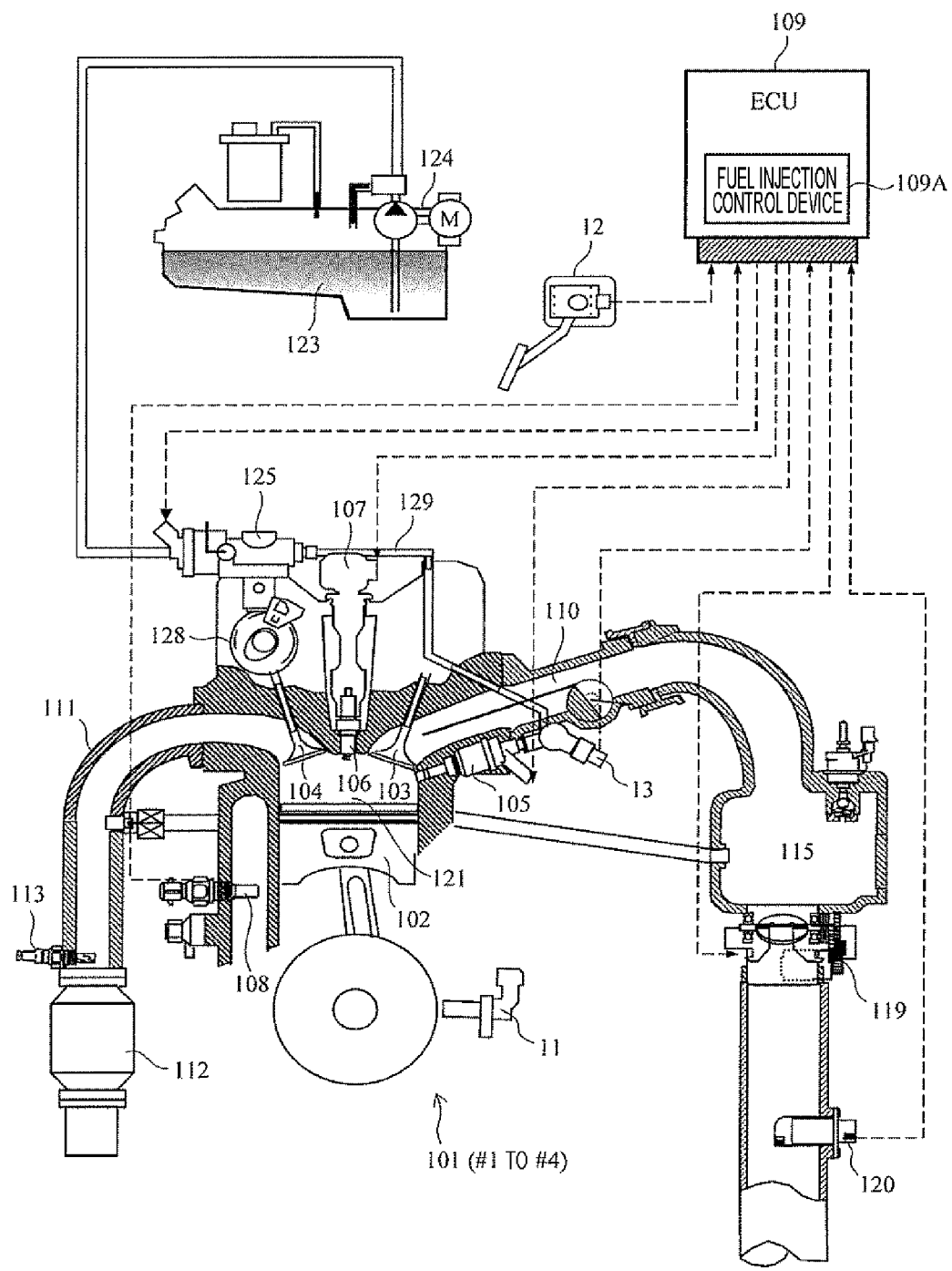
FIG. 1 shows a basic configuration of an internal combustion engine including a fuel injection control device according to a first embodiment.

FIG. 1 shows a basic configuration of an internal combustion engine including a fuel injection control device according to a first embodiment.

In FIG. 1, an internal combustion engine 101 to be controlled includes a piston 102, an intake valve 103, and an exhaust valve 104 inside a cylinder. As an example, the internal combustion engine 101 can be an internal combustion engine having a plurality of (for example, four) cylinders (#1 to #4), but FIG. 1 shows only one cylinder of the plurality of cylinders. A fuel injection valve 105 directly injects fuel into the combustion chamber in the cylinder, and the cylinder head has an ignition plug 106 and an ignition coil 107. A water temperature sensor 108 for cooling water is provided in the water jacket of the cylinder. An engine control unit (ECU) 109 is provided as a control unit that controls the internal combustion engine 101. A crank angle sensor 11 that measures the crankshaft angle of the internal combustion engine 101 is attached to the piston 102. Further, the ECU 109 is provided with an accelerator opening sensor 12 that measures the opening of the accelerator operated by the driver. The detection signals of the crank angle sensor 11 and the accelerator opening sensor 12 are input to a fuel injection control device 109A of the ECU 109.

Also, an intake pipe 110 for introducing the air taken into the internal combustion engine 101 is provided before the intake valve 103, and an exhaust pipe 111 for discharging the exhaust gas from the cylinder is provided after the exhaust valve 104. A three-way catalyst 112 for purifying this exhaust gas and an oxygen sensor 113 are provided at the exhaust pipe 111. Further, the intake pipe 110 is provided with a collector 115, a throttle valve 119, and an air flow meter 120.

The air taken into the internal combustion engine 101 is introduced into the intake pipe 110 via the air flow meter 120, the throttle valve 119, and the collector 115, and then, it is supplied to a combustion chamber 121 via the intake valve 103. The output signal of the air flow meter 120 is supplied to the fuel injection control device 109A of the ECU 109.

The fuel used in the internal combustion engine 101 is sent from a fuel tank 123 to a high pressure fuel pump 125 provided in the internal combustion engine 101 by a low pressure fuel pump 124. The high pressure fuel pump 125 steps up the pressure of the fuel introduced therein by the power transmitted from the exhaust cam shaft (not shown) of an exhaust cam 128. Specifically, the pressure of the fuel introduced into the high pressure fuel pump 125 is increased by vertically moving the plunger provided in the high pressure fuel pump 125. An opening/closing valve provided at the suction port is controlled by a solenoid so that the pressurized fuel pressure of the fuel discharged from the high pressure fuel pump 125 is a desired pressure based on the control command value from the ECU 109. The high pressure fuel is sent to the fuel injection valve 105 via to high pressure fuel pipe 129, and the fuel injection valve 105 injects the fuel into the combustion chamber 121 based on a command from the fuel injection control device 109A provided in the ECU 109.

In order to control the high pressure fuel pump 125, the internal combustion engine 101 is provided with a fuel pressure sensor 13 that measures the pressure in the high pressure fuel pipe 129. The fuel injection control device 109A of the ECU 109 is configured to perform so-called feedback control so that the fuel pressure in the high pressure fuel pipe 129 is a desired pressure based on the output of the fuel pressure sensor 13. As previously mentioned, the internal combustion engine 101 includes the ignition plug 106 and the ignition coil 107, and the ECU 109 executes energization control to the ignition coil 107 and ignition control by the ignition plug 106 based on the output from the fuel pressure sensor 13. As a result, the intake air and the fuel in the combustion chamber 121 are combusted by the sparks emitted from the ignition plug 106, and the pressure pushes down the piston 102.

The exhaust gas generated by the combustion is discharged to the exhaust pipe 111 via the exhaust valve 104, purified by the catalytic action of the three-way catalyst 112, and then discharged to the outside. Further, the oxygen concentration of the exhaust gas is measured by the oxygen sensor 113 provided upstream of the three-way catalyst 112. The output signal of the oxygen sensor 113 is supplied to the fuel injection control device 109A of the ECU 109.

The control of the ECU 109 will be described in more detail. The ECU 109 calculates the required torque of the internal combustion engine 101 from the signal from the accelerator opening sensor 12, and determines whether the engine is in the idle state. The ECU 109 has a function of further calculating the rotation speed of the internal combustion engine 101 (hereinafter, referred to as an engine rotation speed) from the signal of the crank angle sensor 11, and determining whether the three-way catalyst 112 is warmed up based on the cooling water temperature of the internal combustion engine 101 obtained from the water temperature sensor 108, the elapsed time after the start of the internal combustion engine 101, and the like.

Further, the ECU 109 calculates the amount of intake air required for the internal combustion engine 101 from the required torque of the internal combustion engine 101 described above, and outputs the opening signal corresponding to it to the throttle valve 119, and the fuel injection control device 109A calculates the fuel amount corresponding to the amount of intake air to output the corresponding fuel injection signal to the fuel injection valve 105, and further, outputs the ignition signal to the ignition coil 107.

Figure 2:
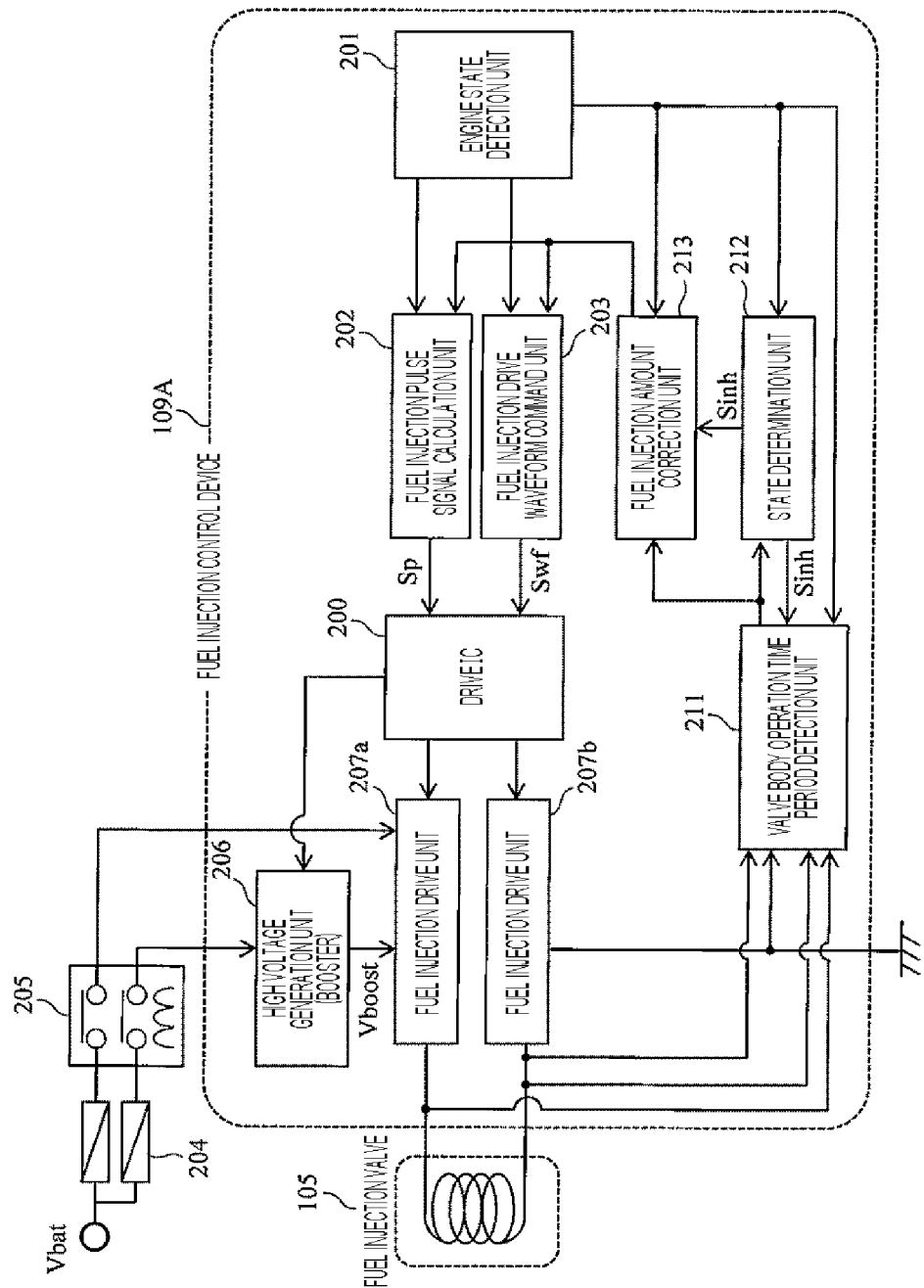
FIG. 2 is a block diagram illustrating a configuration of a fuel injection control device 109A of an ECU 109 shown in FIG. 1.

Next, the configuration of the fuel injection control device 109A of the ECU 109 shown in FIG. 1 will be described using the block diagram of FIG. 2.

The fuel injection control device 109A includes a drive IC 200, an engine state detection unit 201, a fuel injection pulse signal calculation unit 202, a fuel injection drive waveform command unit 203, a high voltage generation unit (booster) 206, fuel injection drive units 207*a* and 207*b*, a valve body operation time period detection unit 211, a state determination unit 212, and a fuel injection amount correction unit 213. The drive IC 200 is a drive control unit that controls the entire fuel injection control device 109A. The engine state detection unit 201 collects and provides various pieces of information such as the engine rotation speed of the internal combustion engine 101, the amount of intake air, the cooling water temperature, the fuel pressure, and the failure state of the internal combustion engine.

The fuel injection pulse signal calculation unit 202 calculates, based on various pieces of information obtained from the engine state detection unit 201, a pulse width Wp of an injection pulse Sp that defines the fuel injection period of the fuel injection valve 105, and outputs a drive pulse Sp having the pulse width Wp. The fuel injection drive waveform command unit 203 calculates a command value Swf related to the waveform of a drive current Id supplied to open the fuel injection valve 105 or maintain the opening to output the calculated command value Swf to the drive IC 200. The lift amount of the valve body and the valve closing timing can be appropriately set, and the fuel injection amount can be precisely controlled by controlling the waveform of the drive current Id.

The high voltage generation unit 206 is a booster that boosts a battery voltage Vbat supplied via a fuse 204 and a relay 205 to a boosted voltage Vboost. The boosted voltage Vboost is a voltage required to change the electromagnetic solenoid type fuel injection valve 105 from the valve close state to the valve open state. The high voltage generation unit 206 boosts the battery voltage Vbat to the boosted voltage Vboost based on the command from the drive IC 200. The battery voltage Vbat is used to maintain the opened fuel injection valve 105 in the valve open state. That is, there are two types of voltage supplied to the fuel injection valve 105: the battery voltage Vbat and the boosted voltage Vboost.

The fuel injection drive units 207*a* and 207*b* are provided upstream and downstream of the fuel injection valve 105, respectively. The fuel injection drive units 207*a* and 207*b* are switching devices that are turned ON/OFF according to a control signal from the drive IC 200, and as a result, the supply of the drive current Id to the fuel injection valve 105 is switched (switching). The drive IC 200 switches ON/OFF of the fuel injection drive units 207*a* and 207*b* based on the injection pulse Sp calculated by the fuel injection pulse signal calculation unit 202 and the command value Swf of the drive current waveform calculated by the fuel injection drive waveform command unit 203 and applies the boosted voltage Vboost or the battery voltage Vbat to the fuel injection valve 105 to control the drive current Id supplied to the fuel injection valve 105.

The valve body operation time period detection unit 211 has a function of detecting the valve body operation time period of the fuel injection valve 105 when a predetermined condition is given. The valve body operation time period is defined as a concept including both the valve opening completion time period from a certain reference point to the valve opening completion time or the valve closing completion time period from a certain reference point to the valve closing completion time. The valve body operation time period detected by the valve body operation time period detection unit 211 is detected as a factor of the correction performed in the fuel injection amount correction unit 213 that corrects the fuel injection amount of the internal combustion engine 101. The detailed function will be described later.

The state determination unit 212 has a function of determining the states of the fuel injection valve 105, the valve body operation time period detection unit 211, or the fuel injection drive units 207*a* and 207*b* according to the detection result of the valve body operation time period detection unit 211. The specific procedure of the determination will be described later.

The fuel injection amount correction unit 213 determines the correction of the fuel injection amount to be performed in the internal combustion engine 101 according to the information of the valve body operation time period detected by the valve body operation time period detection unit 211 to generate a signal for performing the correction. The correction in the fuel injection amount correction unit 213 is stopped according to the determination result in the state determination unit 212.

Figure 3:
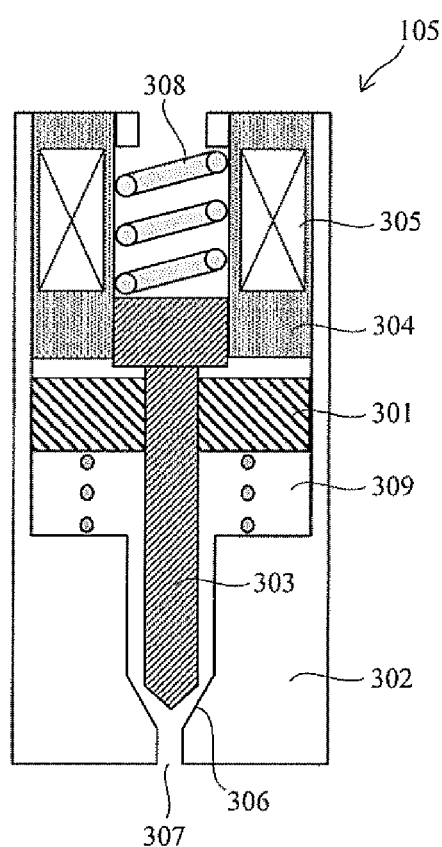
FIG. 3 is a schematic diagram illustrating a configuration example of a fuel injection valve 105.

Next, a configuration example of the fuel injection valve 105 will be described with reference to FIG. 3.

The fuel injection valve 105 may be configured to include, for example, a movable core 301, a housing 302, a valve body 303, a fixed core 304, a solenoid 305, a valve seat 306, a set spring 308, and a zero spring 309.

The housing 302 constitutes the housing of the fuel injection valve 105, and the fixed core 304 is fixed in the housing 302. The solenoid 305 is disposed around the fixed core 304. The valve body 303 is disposed with the central axis of the housing 302 as the longitudinal direction, movably disposed along the central axis of the housing 302, and further, urged toward the valve seat 306 by the set spring 308. Further, the movable core 301 is biased by the zero spring 309 toward the lower end of the fixed core 304. A through hole is formed in the central axis of the movable core 301, and the valve body 303 is movably disposed along the through hole.

During the operation of the internal combustion engine 101, the inside of the housing 302 is filled with the fuel. When current flows through the solenoid 305, the movable core 301 is attracted to the solenoid 305, and the lower end of the valve body 303 moves away from the valve seat 306. As a result, the fuel is injected from an injection hole 307 of the valve 303 that is blocked by the valve body 303. When the electric current of the solenoid 305 is cut off, the movable core 301 descends against the elastic force of the zero spring 309 after the end of fuel injection and returns to the initial position.

Figure 4:
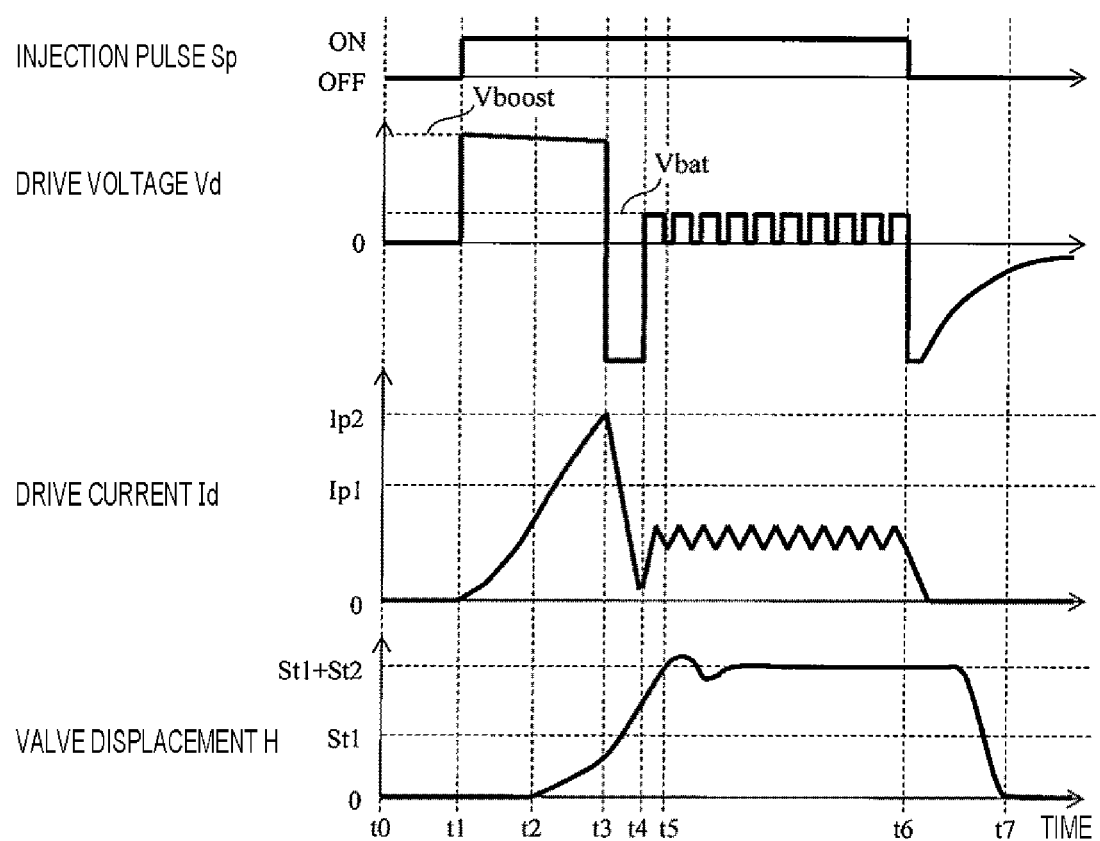
FIG. 4 is a timing chart illustrating an example of temporal changes in an injection pulse Sp, a drive voltage Vd, a drive current Id, and a displacement amount (valve displacement) H of a valve body 303 when an internal combustion engine 101 performs a normal operation.

Referring to the timing chart of FIG. 4, an example of the injection pulse Sp, a drive voltage Vd, the drive current Id, and the displacement amount (valve displacement) H of the valve body 303 when the internal combustion engine 101 performs a normal operation is shown.

Since the injection pulse Sp output from the fuel injection pulse signal calculation unit 202 is turned off from time t0 to t1, the fuel injection drive units 207a and 207b are turned off, and the drive current Id does not flow through the fuel injection valve 105. Therefore, in the fuel injection valve 105, the valve body 303 is biased in the valve closing direction of the valve seat 306 by the biasing force of the set spring 308, and the lower end of the valve body 303 remains in contact with the valve seat 306 and the injection hole 307 is closed, so that no fuel is injected.

Next, at time t1, the injection pulse Sp rises (turned on), the fuel injection drive unit 207a and the fuel injection drive unit 207b are turned on (conduction state), and as a result, the boosted voltage Vboost is started to be applied to the fuel injection valve 105. The boosted voltage Vboost as the drive voltage Vd is applied to the solenoid 305 of the fuel injection valve 105, the drive current Id also starts to flow, and the drive current Id gradually starts to rise. As a result, the magnetic flux is generated between the fixed core 304 and the movable core 301, and the magnetic attraction force is exerted on the movable core 301 toward the fixed core 304.

When the drive current Id supplied to the solenoid 305 increases, and the magnetic attraction force acting on the movable core 301 exceeds the biasing force of the zero spring 309, the movable core 301 is attracted toward the fixed core 304 and starts moving upward (time t1 to t2). When the movable core 301 moves by a predetermined length, the movable core 301 and the valve body 303 start moving together (time t2), the valve body 303 moves away from the valve seat 306, the valve seat 306 is opened, and fuel injection is started.

The movable core 301 and the valve body 303 move together until the movable core 301 collides with the fixed core 304. In FIG. 4, the movable core 301 moves until the valve displacement H reaches St1+St2, and this state is the so-called full lift state. The movement of the movable core 301 may be suppressed to the degree of the valve displacement St1, which is the above-mentioned half-lift state.

Here, when the movable core 301 and the fixed core 304 vigorously collide with each other, the movable core 301 may bounce off the fixed core 304 and the flow rate of the fuel injected from the injection hole 307 may be disturbed. Therefore, at time t3 before the movable core 301 collides with the fixed core 304, that is, when the drive current Id reaches the peak current Ip2, the fuel injection drive units 207a and 207b are turned off (non-conducting state). As a result, since the drive voltage Vd applied to the solenoid 305 decreases to a negative value due to the counter electromotive force, and the drive current Id also sharply decreases with this, the momentum of the movable core 301 and the valve body 303 decreases.

Since only a magnetic attraction force sufficient to keep the movable core 301 attracted to the fixed core 304 is supplied from time t4 to time t6 when the injection pulse Sp falls, the PWM control in which the fuel injection drive unit 207a is intermittently turned on while the fuel injection drive unit 207b is maintained to be turned on (repeating ON and OFF at a predetermined duty ratio) is performed. The drive voltage Vd applied to the solenoid 305 is switched between the battery voltage Vbat and 0 V in a predetermined cycle, so that the drive current Id flowing in the solenoid 305 is kept within a predetermined range.

The injection pulse Sp falls at time t6, whereby the fuel injection drive units 207a and 207b are both turned off, the drive voltage Vd applied to the solenoid 305 decreases, and the drive current Id flowing in the solenoid 305 also decreases. Then, the magnetic flux generated between the fixed core 304 and the movable core 301 gradually disappears, and the magnetic attraction force acting on the movable core 301 disappears. Therefore, the valve body 303 is pushed back by the biasing force of the set spring 308 and the pressing force of the fuel pressure in the valve closing direction of the valve seat 306 with a predetermined time delay. Then, at time t7, the valve body 303 is returned to the original position, the lower end of the valve body 303 contacts the valve seat 306, and the valve is closed, so that the fuel injection is stopped.

After time t6 when the injection pulse Sp falls, the drive voltage Vd is supplied in the direction opposite to that when driving the fuel injection valve 105 so that the residual magnetic force in the fuel injection valve 105 is quickly reduced, and the valve body 303 is returned to the valve close state early.

Next, with reference to FIGS. 5 to 7, a procedure for detecting the valve body operation time period of the fuel injection valve 105 by the valve body operation time period detection unit 211 will be described. The valve body operation time period detected here is used for the calculation of the correction value in the fuel injection amount correction unit 213.

Figure 5:
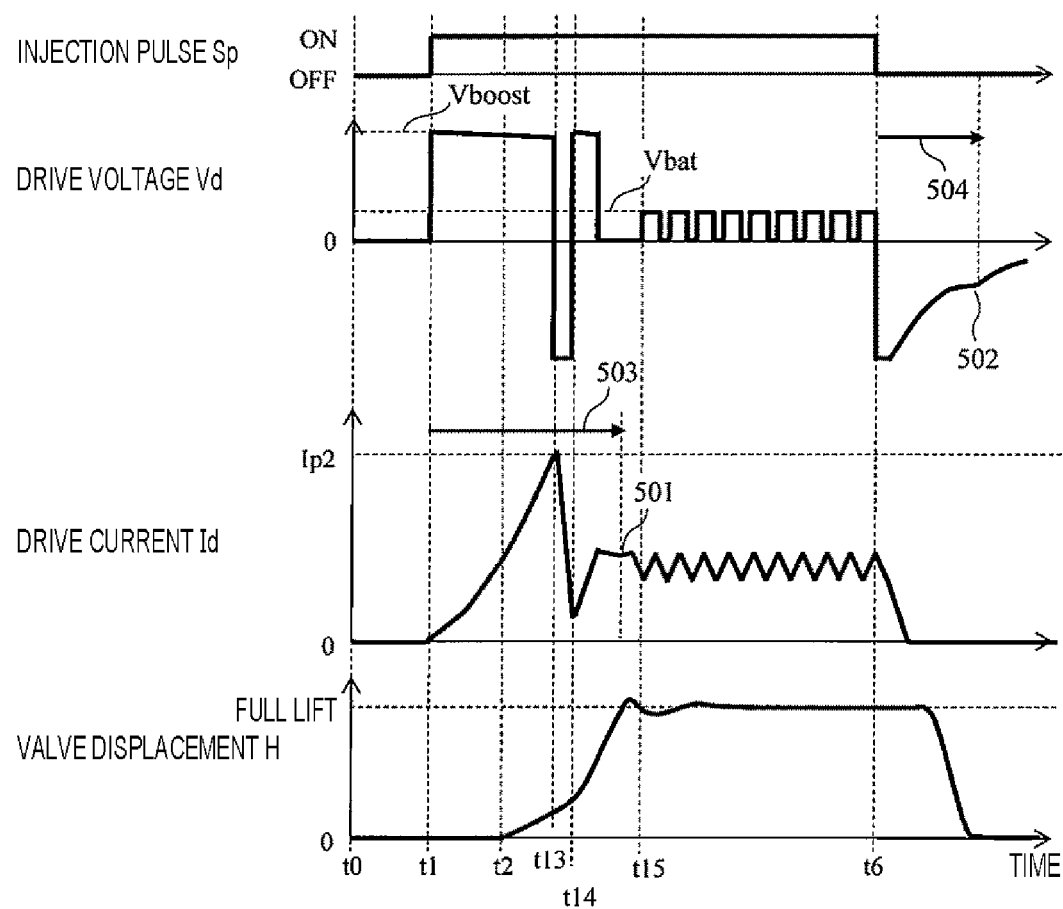
FIG. 5 is a timing chart illustrating a procedure for detecting a valve body operation time period of the fuel injection valve 105 by a valve body operation time period detection unit 211.
Figure 6:
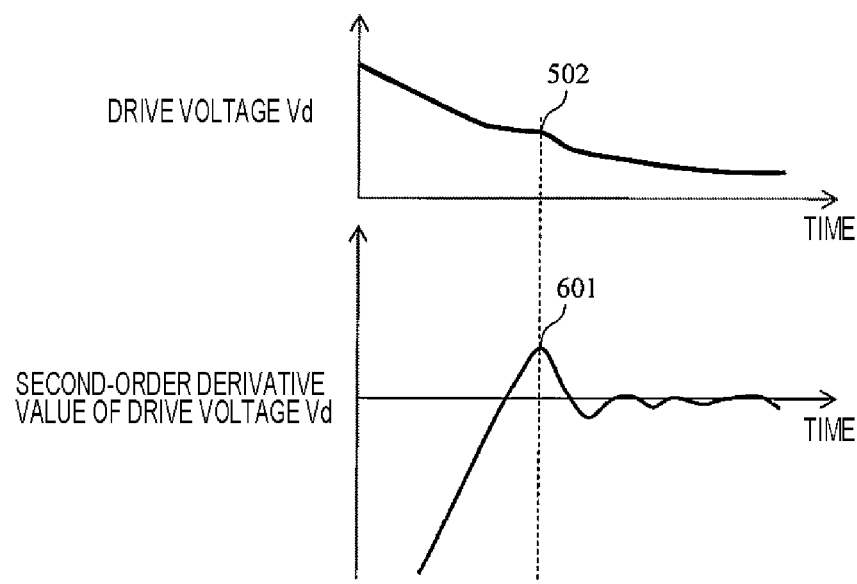
FIG. 6 is a graph illustrating a procedure for detecting a valve body operation time period of the fuel injection valve 105 by the valve body operation time period detection unit 211.
Figure 7:
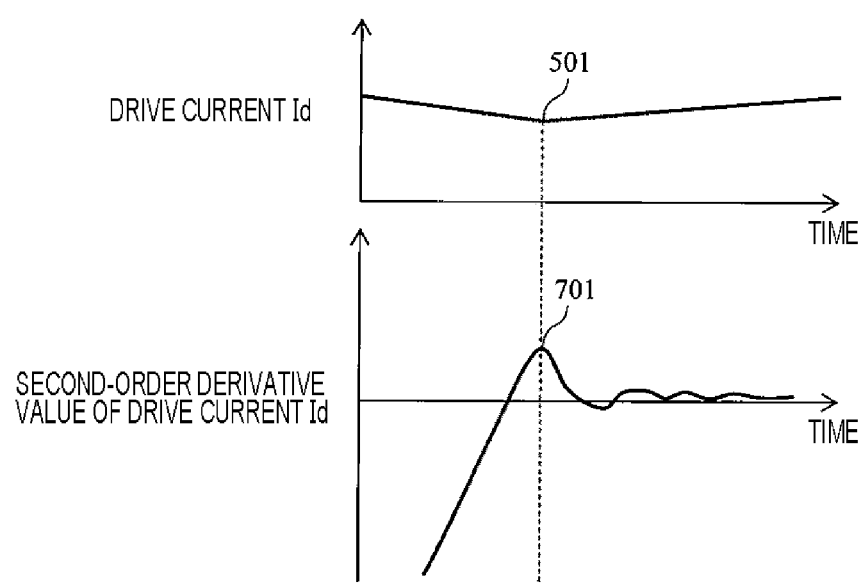
FIG. 7 is a graph illustrating a procedure for detecting a valve body operation time period of the fuel injection valve 105 by the valve body operation time period detection unit 211.

FIG. 5 is a timing chart when the same operations are performed, and FIGS. 6 and 7 are enlarged views of a graph of the drive voltage Vd and the second-order derivative value thereof, and the drive current Id and the second-order derivative value thereof, respectively.

The operation up to time t1 is the same as the normal operation in FIG. 4. At time t1, the injection pulse Sp is turned on, whereby the boosted voltage Vboost as the drive voltage Vd is applied to the solenoid 305 of the fuel injection valve 105, the drive current Id also starts to flow, and the drive current Id gradually starts to rise. The movable core 301 starts moving toward the fixed core 304 from time t2, for example.

Next, at time t13, the boosted voltage Vboost is cut off, whereby the drive current Id sharply decreases, and the drive voltage Vd swings to the negative value due to the counter electromotive force of the solenoid 305. After that, the drive voltage Vd returns to the battery voltage Vbat again for a short period at time t14. Afterwards, the drive voltage Vd is 0 V. This makes the fluctuation amount of the drive current Id small, and in this state, the movable core 301 collides with the fixed core 304. After that, the full lift state is maintained. In order to maintain the full lift state, after time t15, the battery voltage Vbat is supplied to the solenoid 305 by the PWM control as in the normal operation.

When the movable core 301 and the fixed core 304 collide with each other at any time after time t14, the acceleration of the movable core 301 changes and the inductance of the solenoid 305 changes. Here, although the change in the inductance of the solenoid 305 is considered to appear as an inflection point in the drive current Id flowing in the solenoid 305 or the drive voltage Vd applied to the solenoid 305, the drive voltage Vd is kept almost constant when the valve is opened, so that no inflection point appears in the drive voltage Vd, and an inflection point appears in the drive current Id (near reference numeral 501). The valve opening timing of the valve body 303 can be detected by detecting the timing (time) at which the inflection point of the drive current Id appears. In other words, the valve body operation time detection unit detects an inflection point that occurs in a voltage or a current supplied from the fuel injection control device 109A when the valve body of the fuel injection valve 105 opens or closes, and detects timing at which the inflection point appears as timing at which the fuel injection valve 105 opens or timing at which the fuel injection valve 105 closes. Here, the inflection point means a point at which the curve changes in a change curve such as a current or a voltage, and more specifically, a point where the second-order derivative value of the change curve has an extreme value.

On the other hand, in closing the valve body 303 of the fuel injection valve 105, the zero spring 309 changes from extension to compression when the valve body 303 collides with the valve seat 306, and the movement direction of the movable core 301 is reversed, whereby the acceleration changes, and the inductance of the solenoid 305 changes.

At the timing when the valve body 303 closes, the drive current Id flowing in the solenoid 305 is cut off, and the voltage Vd across the solenoid 305 is a counter electromotive force, so that when the drive current Id converges to 0, the counter electromotive force also gradually decreases. The inductance of the solenoid 305 changes during the period in which the counter electromotive force is decreasing (time t6 and thereafter), so that an inflection point occurs in the drive voltage Vd (reference numeral 502). The valve closing timing of the valve body can be detected by detecting the timing (time) at which the inflection point of the drive voltage Vd appears.

In this way, the fuel injection control device of the first embodiment can detect the valve opening timing of the valve body 303 based on the timing of occurrence of the inflection point of the drive current Id, and can detect the valve closing timing of the valve body 303 based on the timing of occurrence of the inflection point of the drive voltage Vd. For example, the valve opening completion time period (503) can be detected by measuring the time from the timing at which the injection pulse Sp rises (time t1) to the timing at which the inflection point of the drive current Id occurs. Also, the valve closing completion time period (504) can be detected by measuring the time from the timing (time t6) when the injection pulse Sp falls to the timing at which the inflection point of the drive voltage Vd occurs. Such a valve opening completion time period or a valve closing completion time period as the valve body operation time period is detected for each of the fuel injection valves 105 of different cylinders and specified as an individual difference, so that the fuel injection amount can be controlled based on this individual difference.

As shown in FIGS. 6 and 7, the inflection point can be obtained by second-order differentiating the curve of the drive current Id flowing in the solenoid 305 (time series data) or the curve of the drive voltage Vd applied to the solenoid 305. In the second-order derivative curve, the inflection point described above appears as a maximum value or a minimum value. Therefore, the inflection point described above can be specified by detecting the position of the extreme value of the second-order derivative curve.

FIG. 6 shows part of the curve of the drive voltage Vd during the valve closing operation and time series data of the second-order derivative value thereof, and 601 is an extreme value corresponding to the inflection point 502. FIG. 7 shows part of the curve of the drive current Id during the valve opening operation and time series data of the second-order derivative value thereof, and 701 is an extreme value corresponding to the inflection point 501. The drive voltage Vd in FIG. 6 is shown by reversing the positive and negative sides with respect to FIGS. 4 and 5.

The second-order derivative value of the drive voltage Vd and the second-order derivative value of the drive current Id shown in FIGS. 6 and 7 are obtained by making the signals of the drive voltage Vd and the drive current Id passing through a low pass filter, and second-order differentiating the smoothed data. When the measured drive current Id or the measured drive voltage Vd has a low S/N ratio and its noise level is high, it is difficult to detect the extreme value from the result of second-order differentiating the time series data of the drive current Id and the drive voltage Vd, so that the low pass filter can be used. When the S/N ratio is sufficiently high, the low pass filter can be omitted.

Further, it is preferable that the time series data to be second-order differentiated be time series data of the drive current Id after a certain time has elapsed from the rising timing of an injection pulse Sa (in other words, after a certain time has elapsed from the rise of the drive voltage Vd or the drive current Id), or time series data of the drive voltage Vd after a certain time has passed from the falling timing of the injection pulse Sa (in other words, after a certain time has elapsed from the fall of the drive voltage Vd or the drive current Id).

This is because there is a possibility that when second-order differentiating the time series data of the drive current Id immediately after the timing (time t1) when the injection pulse Sa rises, or the time series data of the drive voltage Vd immediately after the timing (time t6) when the injection pulse Sa falls, extreme values may appear when the voltage is switched (for example, from the boosted voltage Vboost to the battery voltage Vbat) or when the counter electromotive force occurs after the drive voltage Vd is cut off, and the inflection point cannot be accurately specified.

Next, with reference to FIG. 8, an example of the configuration of the valve body operation time period detection unit 211 of FIG. 2 will be described. The state determination unit 212 determines, based on the information about the valve opening completion time period or the valve closing completion time period calculated by the valve body operation time period detection unit 211, whether the functions of the fuel injection valve 105, the valve body operation time period detection unit 211, various circuits that drives the fuel injection valve 105, and other components in the fuel injection control device 109A are normal or abnormal.

Here, the circuit (fuel injection valve drive circuit) that drives the fuel injection valve 105 includes the drive IC 200, the high voltage generation unit 206, the fuel injection drive units 207a and 207b, the signal lines electrically connected to them, the harness that connects the fuel injection control device 127 and the power supply device of the battery voltage Vbat, the harness that connects the fuel injection control device 127 and the fuel injection valve 105, and the like.

Figure 8:
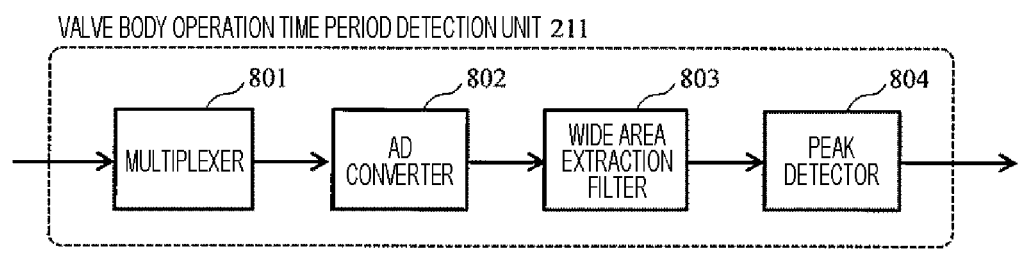
FIG. 8 is a block diagram illustrating a configuration example of the valve body operation time period detection unit 211.

As shown in FIG. 8, the valve body operation time period detection unit 211 can be configured to include, for example, a multiplexer 801, an AD converter 802, a wide area extraction filter 803, and a peak detector 804.

The multiplexer 801 has a function of selectively receiving a signal from the plurality of fuel injection valves 105 provided in the plurality of cylinders (#1 to #4). Although not shown, a shunt resistor is provided between the downstream terminal of the solenoid 305 of the fuel injection valve 105 and the ground terminal, and the voltage across the shunt resistor can be input to the multiplexer 801.

The AD converter 802 is a circuit that converts an analog signal input from the fuel injection valve 105 via the multiplexer 801 into a digital signal. The A/D converter 802 can convert a downstream terminal voltage of the solenoid 305 of the fuel injection valve 105 or a differential voltage between upper and lower terminal voltages into a digital signal.

Further, the wide area extraction filter 803 has a function of smoothing the digital signal and second-order differentiating the smoothed signal. The peak detector 804 has a function of detecting an extreme value from the signal which is second-order differentiated by the wide area extraction filter 803 and whose inflection point is emphasized. The peak detector 804 can detect the valve opening completion time period by specifying the timing at which the second-order derivative value is maximized of the time when the extreme value is detected, and measuring, for example, the time from the timing at which the injection pulse Sp rises.

When an abnormality (fault, deterioration, etc.) occurs in any of the fuel injection valve 105, the circuit that drives the fuel injection valve 105, and the valve body operation time period detection unit 211, the timing of occurrence of the inflection point of the drive current Id or the drive voltage Vd changes, and furthermore, the timing of occurrence of the extreme value of the second derivative curve changes.

For example, when the fuel injection valve 105 is stuck when opened or closed, the fuel injection valve 105 is not opened or closed, so that it is considered that the inflection point of the drive current Id or the drive voltage Vd is not detected, but actually, the valve body operation time period detection unit 211 may detect a variation due to a minute noise component as an inflection point. In this case, the valve body operation time period calculated by the valve body operation time period detection unit 211 is not synchronized with the actual valve body operation of the fuel injection valve 105, and the time deviates from that at the normal state.

In addition, when the circuit that drives the fuel injection valve 105 fails, the fuel injection valve 105 cannot be driven normally, so that when the valve body operation time period detection unit 211 is operated in a failure state, the detected inflection point is not synchronized with the actual operation of the valve body 303.

Further, the same applies to the valve body operation time period detection unit 211. Even though the fuel injection valve 105 is operating normally, the inflection point caused by the valve body operation of the fuel injection valve 105 cannot be accurately detected from the drive current Id or the drive voltage Vd, and the valve body operation time period deviates from that at the normal time. For example, when the multiplexer 801 fails, the drive current Id or the drive voltage Vd cannot be input at desired timing. When a failure of the A/D converter 802, the wide area extraction filter 803, or the peak detector 804 occurs, the inflection point in synchronization with the valve body operation cannot be extracted from the drive voltage Vd and the drive current Id, and the valve body operation time period deviates from that at the normal time.

As described above, when an abnormality occurs in any of the fuel injection valve 105, the circuit that drives the fuel injection valve 105, and the valve body operation time period detection unit 211, the valve body operation time period does not match the time in synchronization with the operation of the valve body 303. Therefore, in this first embodiment, presence or absence of an abnormality is determined by detecting the valve body operation time period by the valve body operation time period detection unit 211 to compare the valve body operation time period with the reference value in the state determination unit 212.

An abnormality determination method based on the valve closing completion time period, which is the time from the time when the injection pulse Sp falls to the maximum value of the second-order derivative curve of the drive voltage Vd, will be described with reference to FIG. 9. In this example, the valve closing completion time period is described as an example, but the same method can be applied to the case where the valve opening completion time period is detected.

Figure 9:
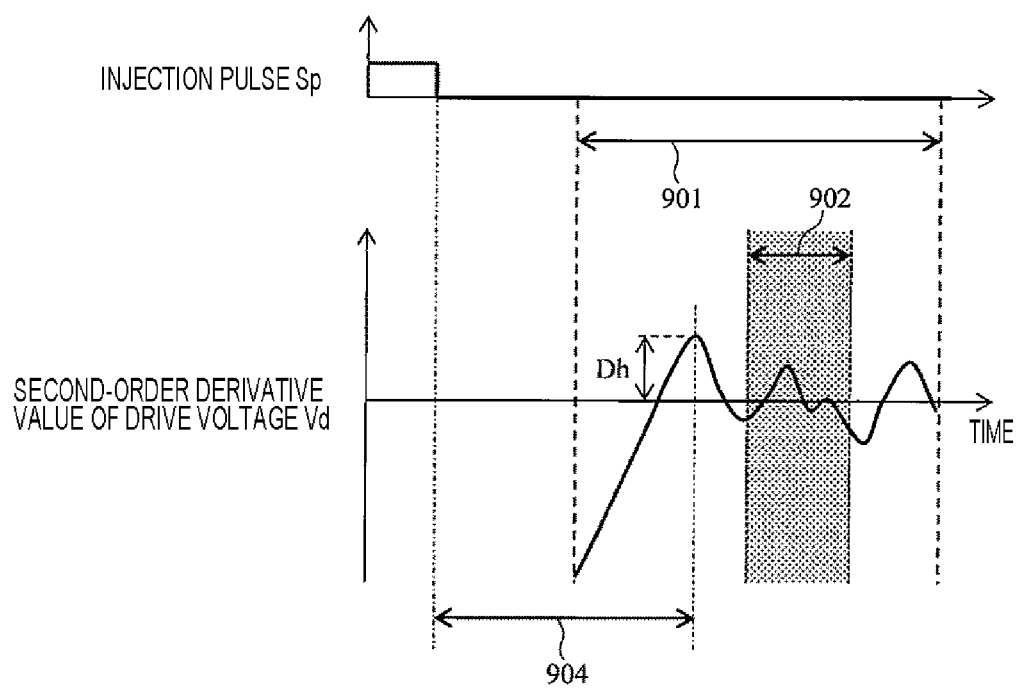
FIG. 9 describes the abnormality determination method by the state determination unit 212 according to the first embodiment.

In the method of FIG. 9, the state determination unit 212 determines whether a valve closing completion time period 904 of the valve body 303 is within a set range 902. The set range 902 is a range of valve closing completion time period that is expected when there is no abnormality in any of the fuel injection valve 105, the circuit that drives the fuel injection valve 105, and the valve body operation time period detection unit 211. The set range 902 is stored in the storage unit (not shown) of the state determination unit 212.

When the valve closing completion time period 904 detected by the valve body operation time period detection unit 211 does not fall within the set range 902, the state determination unit 212 determines that an abnormality has occurred. When the valve closing completion time period 904 detected by the valve body operation time period detection unit 211 falls within the set range 902, the state determination unit 212 determines that all of the above components are normal.

Instead of making a determination of an abnormality when the one detected valve closing completion time period 904 does not fall within the set range 902, it is possible to make a determination of an "abnormality" when a predetermined ratio of the valve closing completion time period 904 of the valve closing completion time period 904 obtained in a plurality of ways does not fall within the set range 902.

The set range 902 is calculated in advance by an experiment in consideration of a change in the valve body operation time period when the fuel injection valve 105 is deteriorated, and is stored in a storage unit (not shown) of the state determination unit 212. Further, the valve body operation time period of the fuel injection valve 105 also changes depending on the fuel pressure. Therefore, the set range 902 may be set so that the fuel pressure is measured and the range is variable according to the fuel pressure.

In the first embodiment, the sampling period of the drive voltage Vd is set as a range 901 shown in FIG. 9. The sampling range 901 is preferably set to start after a predetermined time has passed after the injection pulse Sp has fallen. It is possible to avoid an erroneous detection of the inflection point due to the counter electromotive force after the injection pulse Sp has fallen.

When the detection by the valve body operation time period detection unit 211 is completed, the fuel injection amount correction unit 213 calculates a valve opening completion deviation, which is a deviation between a reference valve opening completion time period stored in advance and a valve opening completion time period detected by the valve body operation time period detection unit 211. Similarly, a valve closing completion deviation, which is a deviation between a reference valve closing completion time period stored in advance and a valve closing completion time period detected by the valve body operation time period detection unit 211, is calculated.

Figure 10:
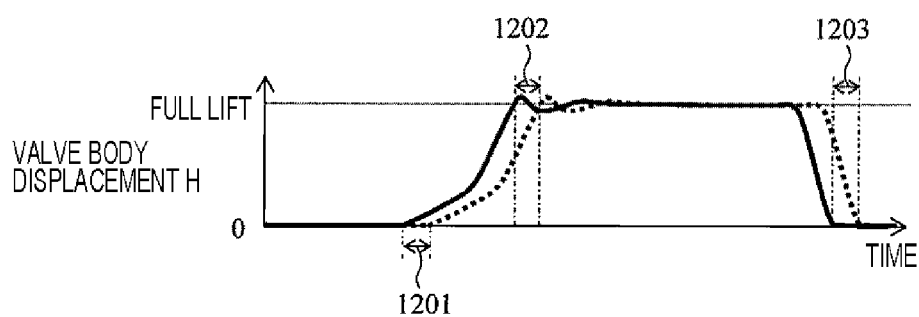
FIG. 10 is a schematic diagram illustrating an injection amount correction in a fuel injection amount correction unit 213.

There is a correlation between the valve opening start deviation and the valve opening completion deviation, which will be described with reference to FIG. 10. In FIG. 10, the solid line graph shows a standard curve of the valve body displacement H, and the dotted line graph shows the actual valve body displacement. It is generally known that a valve opening completion deviation 1202 is substantially a multiple of (K times) of a valve opening start deviation 1201 regardless of the injection characteristics of each fuel injection valve 105. Therefore, the valve opening start deviation 1201 is calculated by multiplying the valve opening completion deviation 1202 by the gain 1/K. Similarly, a valve closing completion deviation 1203 is also calculated. The pulse width of the curve of valve displacement H is calculated based on the valve opening start deviation 1201 and the valve closing completion deviation 1203 to compare it with the pulse width H(s) of the reference valve displacement H stored in advance to calculate the deviation between the two. As a result, the correction amount of the injection pulse width Wp with respect to the required injection amount can be determined.

In the above example, both the valve opening start deviation 1201 and the valve closing completion deviation 1203 are used, but it is also possible to correct the injection pulse width by using either one of the valve opening completion deviation 1202 and the valve closing completion deviation 1203.

Further, in the above example, the drive pulse width Wp is corrected, but it is also possible to perform the injection amount correction by correcting a drive current Ip. For example, when the valve opening completion time period detected by the valve body operation detection unit 211 is long for the reference valve opening completion time period, it is possible to accelerate the valve opening operation of the valve body 303 (shorten the valve opening completion time period) by making the peak current of the drive current Ip relatively large.

On the contrary, when the valve opening completion time period detected by the valve body operation detection unit 211 is short for the reference valve opening completion time period, it is possible to delay the valve opening operation of the valve body 303 by making the peak current of the drive current Ip relatively small. In this way, the characteristics of the reference fuel injection valve 105 can be approximated. Similarly for the valve closing completion time period, when the valve closing completion time period detected by the valve body operation detection unit 211 is long for the reference valve closing completion time period, it is possible to delay the valve opening operation of the valve body 303 by making the peak current of the drive current cormorant Ip small. On the contrary, when the valve closing completion time period detected by the valve body operation time period detection unit 211 is short for the reference valve closing completion time period, it is possible to accelerate the valve opening operation of the valve body 303 by making the peak current large. Therefore, the characteristics of the reference fuel injection valve can be approximated.

Since the injection amount correction described above is performed based on at least one of the valve opening completion time period and the valve closing completion time period detected by the valve body operation time period detection unit, the correction value will also be abnormal when these values is abnormal, so that it is not possible to perform the appropriate correction, and as a result, it is difficult to carry out the fuel injection with the required injection amount. Therefore, the correction of the fuel injection amount performed by the fuel injection amount correction unit 213 is performed only when the state determination unit 212 determines that there is no abnormality in any of the fuel injection valve 105, the circuit that drives the fuel injection valve 105, and the valve body operation time period detection unit 211. On the other hand, when the state determination unit 212 determines that these components are abnormal, the correction performed by the fuel injection amount correction unit 213 is prohibited. When it is determined that the components are abnormal, the state determination unit 212 transmits a prohibition signal Sin h to the fuel injection amount correction unit 213, and the fuel injection amount correction unit 213 stops the correction operation based on this prohibition signal Sin h. Further, the valve body operation time period detection unit 211 also stops the operation of detecting the valve body operation time period based on the prohibition signal Sin h.

The valve opening completion time period and valve closing completion time period detected by the valve body operation time period detection unit 211, and the state determination result calculated by the state determination unit 212 are stored in storage means such as an EEPROM provided inside or separately thereof.

Figure 11:
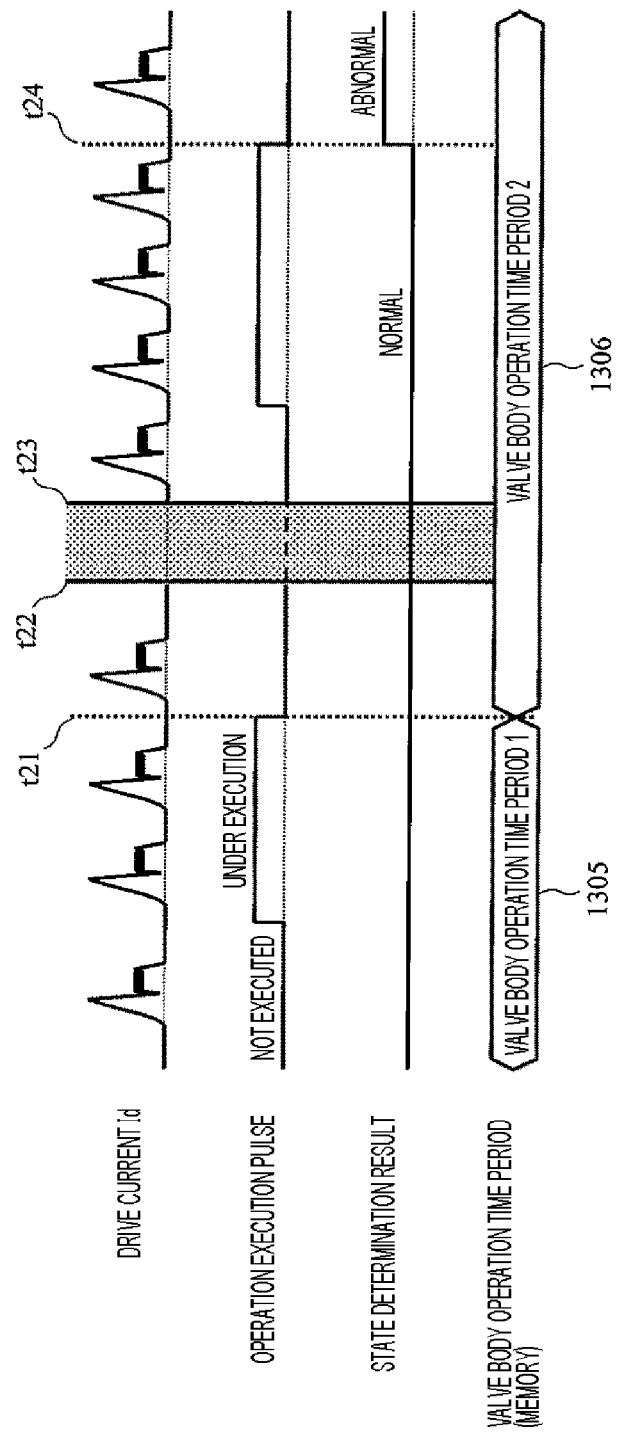
FIG. 11 is a timing chart for explaining prohibition of the injection amount correction in the first embodiment.

FIG. 11 is a timing chart showing a change over time of the drive current Id, the pulse signal indicating whether the operation of the valve body operation time period detection unit 211 is being executed, the determination result of the state determination unit 212 (state determination result), and data of the valve body operation time period stored in the storage means.

The detection of the valve body operation time period by the valve body operation time period detection unit 211 is completed at time t21, and when the state determination unit 212 determines that the result is "normal", a valve body operation time period 1 (1305) stored in the storage means is updated to a valve body operation time period 2 (1306), which is the latest detection result. After time t21, the fuel injection amount is corrected using the valve body operation time period 2 (1306).

The valve body operation time period 2 (1306) is kept stored in the storage means even during the period from time t22 to time t23 when the power supply of the fuel injection control device 109A is turned off at time t22 and the power supply of the fuel injection control device 109A is turned on at time t23. On the other hand, when the detection of the valve body operation time period detection unit 211 is completed again at time t24 and the state determination unit 212 determines that the result is "abnormal", update of the valve body operation time period 2 (1306) stored in the storage means is prohibited, and the valve body operation time period 2 (1306) as the latest injection amount correction is used as it is. With such a configuration, even when the state determination unit 212 makes a determination of an abnormality, the fuel injection amount can be corrected using the valve body operation time period stored when the state determination unit 212 makes a determination of a normality.

In this way, according to the first embodiment, while the valve body operation time period detection unit 211 detects the valve body operation time period to detect individual differences, the state determination unit 212 can determine presence or absence of an abnormality based on the information related to the valve body operation time period. Therefore, it is possible to appropriately execute the collection of information on individual differences.

Further, by making the determination as to whether the injection amount can be corrected based on the result of the determination, it is possible to prevent an unintended change in the injection amount and prevent deterioration of the fuel consumption efficiency and the exhaust performance.

Second Embodiment

Next, a fuel injection control device according to a second embodiment will be described with reference to FIG. 12. The overall configuration of the device (FIGS. 1 to 3 and 8) and the basic operation of the fuel injection control device 109A (FIGS. 5 to 7) are substantially the same as those of the first embodiment, and thus redundant description will be omitted. However, the determination method in the state determination unit 212 in the second embodiment is different from that in the first embodiment.

Figure 12:
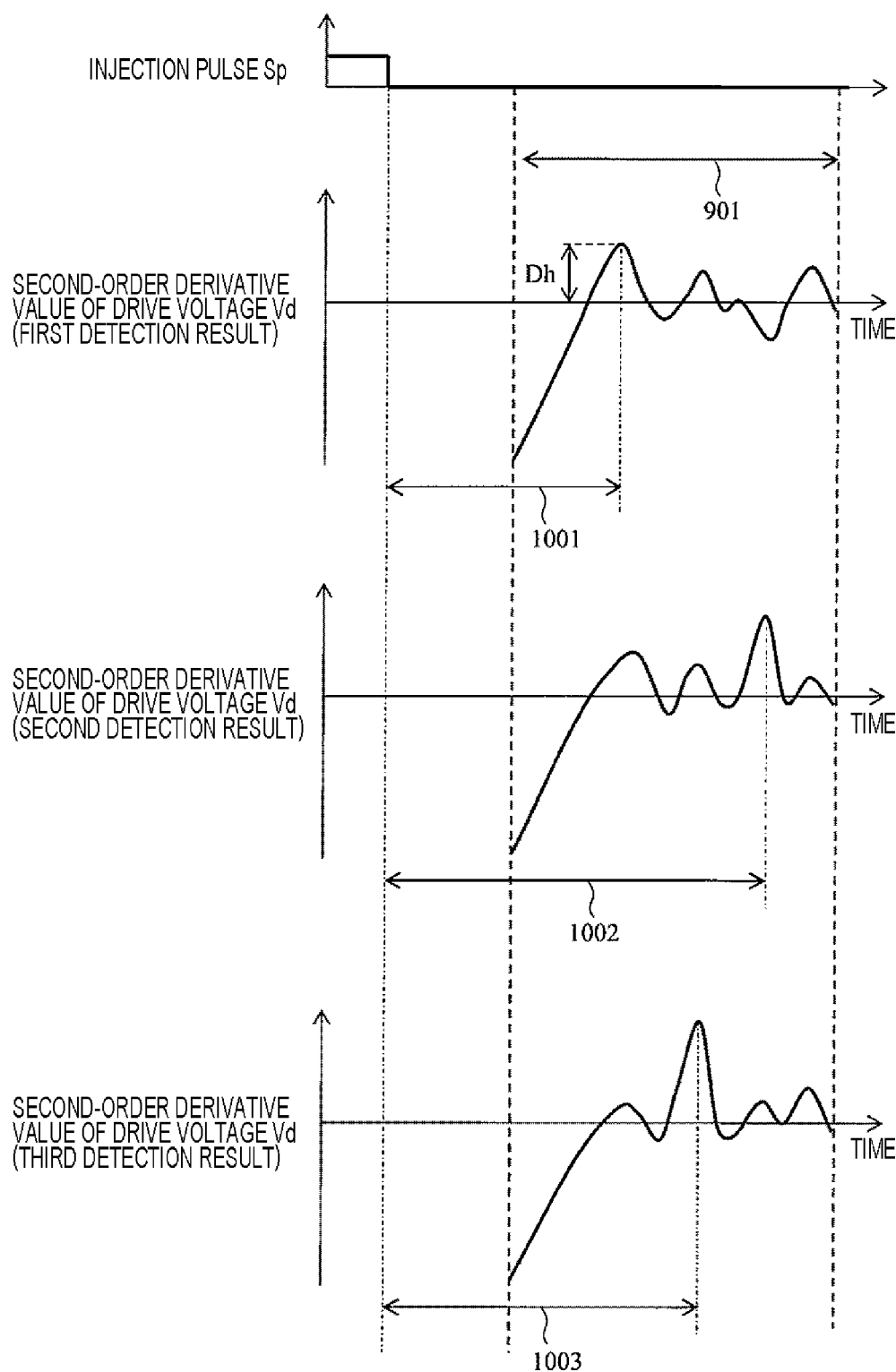
FIG. 12 describes the abnormality determination method by the state determination unit 212 according to a second embodiment.

With reference to FIG. 12, an abnormality determination method in the state determination unit 212 of the second embodiment will be described. In the second embodiment, the presence or absence of an abnormality is determined by whether the data of the plurality of valve closing completion time periods detected by the plurality of times of the operation of the valve body are within the range of the standard deviation. This method can also have the same effect as that of the first embodiment.

In the example in FIG. 12, the valve closing completion time period is measured 3 times, and the presence or absence of an abnormality is determined by whether the measured time periods are within the standard deviation range, in other words, whether the variation is larger than a predetermined set amount. When an abnormality occurs in any of the fuel injection valve 105, the circuit that drives the fuel injection valve 105, and the valve body operation time period detection unit 211, the valve closing completion time period detected by the valve body operation time period detection unit 211 may be different each time it is detected.

In FIG. 10, the valve closing completion time periods 1001, 1002, and 1003 for three times are detected, and it is determined that the result is normal when the standard deviation of respective valve closing completion time periods is within the predetermined range 901, and it is determined that the result is abnormal when the standard deviation is outside the predetermined range. By determining the magnitude of the standard deviation in this way, even when each valve closing completion time period is included in the predetermined range 902 (FIG. 9), it is possible to make a determination of an abnormality because the standard deviation is large. It should be noted that the predetermined range 901 can be determined in advance by experiments in consideration of electrical and mechanical variation of the fuel injection valve and electrical variation of the constituent circuits.

Third Embodiment

Next, a fuel injection control device according to a third embodiment will be described with reference to FIG. 13. The overall configuration of the device (FIGS. 1 to 3 and 8) and the basic operation of the fuel injection control device 109A (FIGS. 5 to 7) are substantially the same as those of the above-described embodiment, and thus redundant description will be omitted. However, the determination method in the state determination unit 212 in the third embodiment is different from that in the above-described embodiments.

Figure 13:
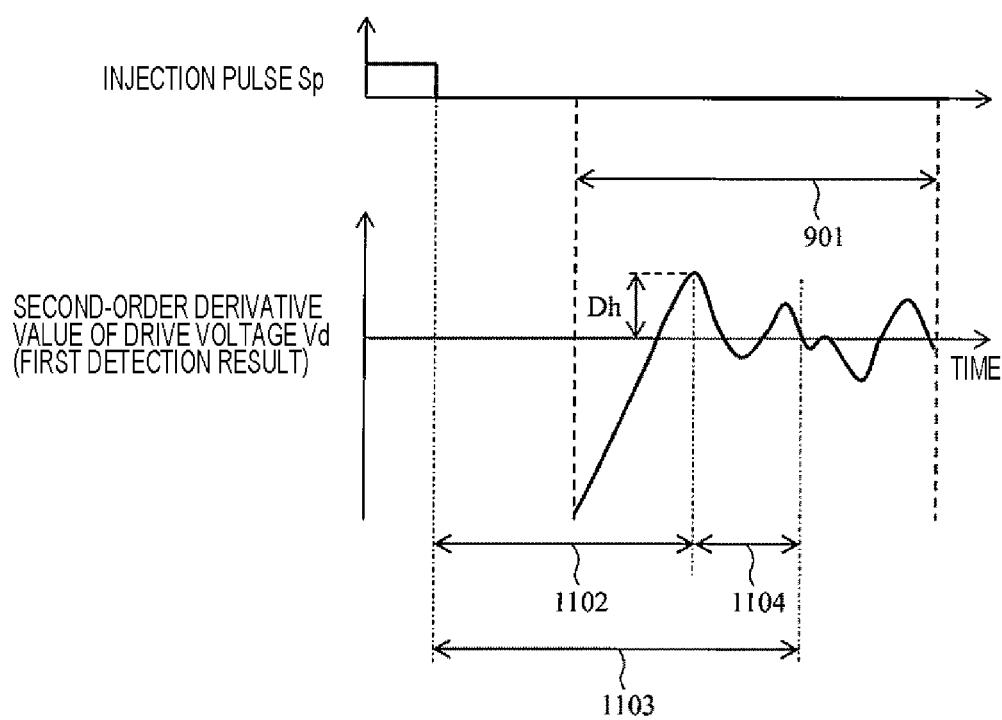
FIG. 13 describes the abnormality determination method by the state determination unit 212 according to a third embodiment.

With reference to FIG. 13, an abnormality determination method in the state determination unit 212 of the third embodiment will be described.

In the same fuel injection valve 105, deterioration with time is one of the factors that change the valve body operation time period. That is, it is possible to make a determination of an abnormality when there is the deviation that is more than a change due to deterioration over time when comparing a valve closing completion time period 1103 detected when any of the fuel injection valve 105, the circuit that drives the fuel injection valve 105, the valve body operation time period detection unit 211 are normal with a newly detected valve closing completion time period 1102. Therefore, the valve closing completion time period 1103 detected during normal operation is compared with the newly detected valve closing completion time period 1102. When the difference 1104 is less than or equal to a predetermined value, the state determination unit 212 determines that the fuel injection valve 105, the circuit that drives the fuel injection valve 105, and the valve body operation time period detection unit 211 are normal, and when the difference 1104 is greater than or equal to the predetermined value, the state determination unit 212 determines that any of the fuel injection valve 105, the circuit that drives the fuel injection valve 105, and the valve body operation time period detection unit 211 is abnormal. It is possible to make a robust determination on deterioration of the fuel injection valve 105 and the like by making such a determination.

Note that it is possible to incorporate all the determination methods of the first to third embodiments into one state determination unit 212.

Figure 14:
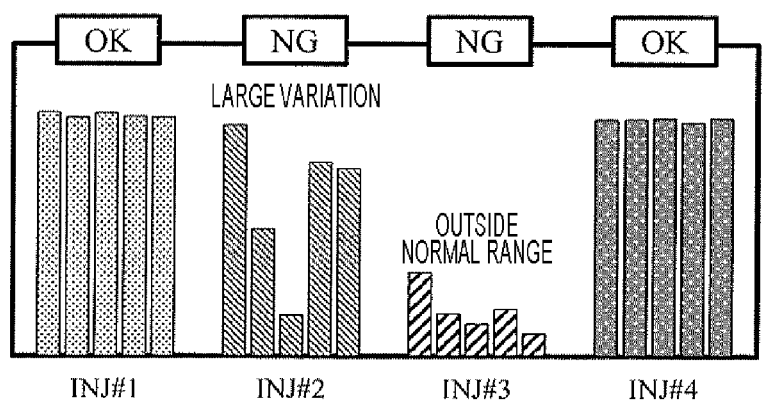
FIG. 14 is a graph explaining the effect of the embodiment of the invention.

The effects of the embodiments of the present invention will be described with reference to FIG. 14. FIG. 14 is a bar graph showing the degree of variation in valve body operation time periods in a plurality of cylinders INJ #1 to 4. In the normal fuel injection control devices INJ #1 and INJ #4, there are almost no variation in the valve body operation time periods, and the valve body operation time periods are close to the reference value. However, as in INJ #3 in FIG. 14, there are cases where the valve body operation time periods are outside the normal range. With such a cylinder, the abnormality can be detected by executing the method of the first embodiment (FIG. 9). Further, as in INJ #2, the valve body operation time periods are close to the reference value, but the valve body operation time periods may vary widely among a plurality of cycles. In this case, the abnormality can be detected by executing the method of the second embodiment (FIG. 12).

In addition, in FIGS. 9 to 11, the example of making a determination of an abnormality based on the valve opening completion time period and the valve closing completion time period is described. The determination may be made based on the magnitude of the second-order derivative value of the drive current Id or the second-order derivative value of the drive voltage Vd instead of or in addition to the valve opening completion time period and the valve closing completion time period.

As described above, the inflection point caused by the valve opening completion or the valve closing completion occurs due to the change in the acceleration of the movable core 301. Therefore, the second-order derivative value of the drive voltage Vd or the second-order derivative value of the drive current Id can be specified in advance by experiment, so that a determination of a normality or an abnormality can be made according to whether the magnitude of the second-order derivative value is within a predetermined range.

Although the embodiments of the present invention have been described above, these embodiments are presented as examples and are not intended to limit the scope of the invention. These novel embodiments can be implemented in various other forms, and various omissions, replacements, and changes can be made without departing from the spirit of the invention. These embodiments and their modifications are included in the scope and gist of the invention, and are also included in the invention described in the claims and the scope of equivalents thereof.

For example, in the description of the electrical configuration of the above embodiment, the wiring that transmits various pieces of data and commands typically shows what is considered necessary for explanation, and not all control lines and information lines provided in corresponding products are shown. In practice, it may be considered that almost all configurations are connected to each other.

Further, each of the above configurations, functions, processing units, and the like may be realized by hardware such as an analog integrated circuit, a digital integrated circuit, or an analog/digital mixed type integrated circuit. Further, each of the above-described configurations, functions, and the like may be realized by a program that causes the processor to realize each function. Such a program can be recorded in a recording medium such as a hard disk drive, a flash memory device, or a recording disk (CD-ROM, DVD-RAM, etc.).

REFERENCE SIGNS LIST

11 crank angle sensor
12 accelerator opening sensor
13 fuel pressure sensor
101 internal combustion engine
102 piston
103 intake valve
104 exhaust valve
105 fuel injection valve
106 ignition plug
107 ignition coil
108 water temperature sensor
109 ECU
109A fuel injection control device
110 intake pipe
111 exhaust pipe
112 three-way catalyst
113 oxygen sensor
115 collector
119 throttle valve
120 air flow meter
121 combustion chamber
123 fuel tank
124 low pressure fuel pump
125 high pressure fuel pump
127 fuel injection control device
128 exhaust cam
129 high pressure fuel pipe
201 engine state detection unit
202 fuel injection pulse signal calculation unit
203 fuel injection drive waveform command unit
204 fuse
205 relay
206 high voltage generation unit (booster)
207a, 207b fuel injection drive unit
211 valve body operation time period detection unit
212 state determination unit
213 fuel injection amount correction unit
301 movable core
302 housing
303 valve body
304 fixed core
305 solenoid
306 valve seat
307 injection hole
308 set spring
309 zero spring
503 valve opening completion time period
504 valve closing completion time period
801 multiplexer
802 AD converter
803 wide area extraction filter
804 peak detector
902 set range
904, 1001-1003, 1102, 1103 valve closing completion time period
1201 valve opening start deviation
1202 valve opening completion deviation
1203 valve closing completion deviation

The invention claimed is:

1. A fuel injection control device comprising:
a fuel injection valve drive circuit that supplies a current or a voltage to a coil of a fuel injection valve to drive the fuel injection valve such that a full-lift control and a half-lift control are selectively performed, the full-lift control fully opening a valve body of the fuel injection valve, and the half-lift control returning the valve body to a closing position without reaching a fully-opening position;
a valve body operation time period detection unit that detects a valve body operation time period related to an operation of a valve body of the fuel injection valve; and
a state determination unit that determines that at least one of the fuel injection valve, the valve body operation time period detection unit, and the fuel injection valve drive circuit is abnormal based on information related to a valve body operation time period detected by the valve body operation time period detection unit,
wherein the state determination unit:
determines that at least one of the fuel injection valve, the valve body operation time period detection unit, and the fuel injection valve drive circuit is abnormal when the valve body operation time period detected by the valve body operation time period detection unit is out of a set range,
determines that at least one of the fuel injection valve, the valve body operation time period detection unit, and the fuel injection valve drive circuit is abnormal when a variation of the valve body operation time period detected by the valve body operation time period detection unit is larger than a set amount,
determines that at least one of the fuel injection valve, the valve body operation time period detection unit, and the fuel injection valve drive circuit is abnormal, when a difference between the valve body operation time period, detected by the valve body operation time period detection unit, and the valve body operation time period, detected when the fuel injection valve, the valve body operation time period detection unit, and the fuel injection valve drive circuit are all in a normal state, is larger than a predetermined value.

2. The fuel injection control device according to claim 1, wherein the valve body operation time period detection unit detects an inflection point that occurs in a voltage or a current supplied from the fuel injection valve drive circuit when the valve body of the fuel injection valve opens or closes, and detects timing at which the inflection point appears as timing at which the fuel injection valve opens or timing at which the fuel injection valve closes.

3. The fuel injection control device according to claim 1, wherein the valve body operation time period detection unit detects an inflection point that occurs in a voltage or a current supplied from the fuel injection valve drive circuit when the valve body of the fuel injection valve opens or closes, and detects timing at which the fuel injection valve opens or closes based on the inflection point.

4. The fuel injection control device according to claim 3, wherein the valve body operation time period detection unit:
   detects an inflection point in a current supplied from the fuel injection valve drive circuit when the valve body of the fuel injection valve opens, and
   detects an inflection point in a voltage supplied from the fuel injection valve drive circuit when the valve body of the fuel injection valve closes.

5. The fuel injection control device according to claim 3, wherein the valve body operation time period detection unit detects timing at which the fuel injection valve opens or closes according to timing at which the inflection point appears.

6. The fuel injection control device according to claim 5, wherein timing at which the inflection point appears is detected as timing at which the fuel injection valve opens or timing at which the fuel injection valve closes.

7. The fuel injection control device according to claim 2, wherein the inflection point is detected based on an extreme value of a second-order derivative value of a change curve of the voltage or the current.

8. The fuel injection control device according to claim 1, further comprising a correction unit that corrects an injection amount of the fuel injection valve based on a valve body operation time period detected by the valve body operation time period detection unit when the state determination unit determines that the fuel injection valve, the valve body operation time period detection unit, and the fuel injection valve drive circuit are normal.

9. The fuel injection control device according to claim 8, wherein a correction by the correction unit is prohibited when the state determination unit determines that at least one of the fuel injection valve, the valve body operation time period detection unit, and the fuel injection valve drive circuit is abnormal.

10. The fuel injection control device according to claim 9, wherein the correction unit is configured to be capable of storing the valve body operation time period obtained from the valve body operation time period detection unit in a storage unit, and an update of the valve body operation time period stored in the storage unit is prohibited when a correction by the correction unit is prohibited.

* * * * *